United States Patent Office 2,958,626
Patented Nov. 1, 1960

2,958,626

BASIC ALUMINUM MAGNESIUM CARBONATE

Remsen Ten Eyck Schenck, Bangor, and August J. Buzas, Easton, Pa., assignors to Keystone Chemurgic Corporation, Bethlehem, Pa., a corporation of Pennsylvania.

No Drawing. Filed Mar. 18, 1957, Ser. No. 646,528

10 Claims. (Cl. 167—55)

This invention relates to a new chemical compound, basic aluminum magnesium carbonate, and to processes for preparing the same.

The affliction of hyperchlorhydria, or gastric hyperacidity (vulgarly, "acid stomach"), is a very common one. It is not of itself a serious complaint, but it can cause severe discomfort. Since it is often of a temporary nature, engendered by some indiscretion of diet, it is usually treated symptomatically. This is fundamentally a simple matter of administering, by mouth, some inoccuous substance which will neutralize the excess acid of the gastric juice.

The selection of a suitable anti-acid for this purpose calls, however, for the exercise of some judgment. It is not sufficient that the remedy be non-toxic, non-irritating and capable of neutralizing acid; other, less obvious, qualities are also demanded. For one thing, the equivalent weight should be low, in order that the indicated dose may be small. For another, the substance should be tasteless, or pleasant-tasting, to avoid inducing nausea. It should react with acid rapidly, so that the relief it affords will be prompt; on the other hand, the neutralization of acid should not be carried too far. It must be remembered that the stomach is normally acid and should remain so; the purpose of treatment for hyperchlorhydria is not to destroy all the acid in the stomach, but merely to remove an excess. Finally, such a remedy should preferably maintain its control over the acidity of the gastric juices for a time, thereby giving a smooth rather than a spasmodic action.

Though the substances which are traditional in the pharmacologic art as gastric anti-acids are many, none of them meets all the requirements enumerated. Calcium and magnesium carbonates, for instance, are tasteless and rapid in action, but they neutralize acid much too thoroughly; if an excess of either be added to gastric juice, the action continues until a pH of nearly 7 is attained. This is too high, since the stomach walls become irritated by a pH much above 4. In response, the gastric mucosa is stimulated to increase its secretion of acid, with the net result that the ultimate acidity may be even higher than originally. This phenomenon is known as "acid rebound." Further disadvantages of calcium and magnesium carbonates are that their equivalent weights lie between 40 and 50, and that neither shows any lasting control over gastric acidity.

Sodium bicarbonate is a much-used gastric anti-acid but is nevertheless one of the least desirable in properties. It over-neutralizes to an even greater extent than calcium or magnesium carbonate, the pH rising as high as 8 if a large dose is taken. Its equivalent weight is very high (84), and it has a saline, faintly fishy taste which some find highly objectionable. Calcium and magnesium hydroxides have both been much prescribed; they have more favorable equivalent weights (37 and 39 respectively), but are the most alkaline of any tolerable anti-acids, giving a pH of 9 or higher. None of these last three substances can exercise control over gastric acidity for more than very brief periods.

By far the best, in every way, of the classical antiacids is aluminum hydroxide. It is tasteless, has the low equivalent weight of 26, and cannot raise the pH of its suspensions above a maximum of about 4. Properly prepared, it reacts with acid very rapidly. Since it cannot over-neutralize, a sufficiently large dose may be taken to give control over excess acidity for a comparatively long time. Its limitation lies in the fact that these properties are found only in the aqueous suspension, the so-called "wet gel," and are more or less lost if this is dried. Since convenience demands that an "acid indigestion" remedy be available as a pill or powder, many efforts have been made to prepare a "dry gel" comparable in effectiveness to the "wet gel." Some of these have been successful to an appreciable degree, but none have been reliably reproducible.

We have now discovered a process for producing the magnesium analogue of basic aluminum sodium carbonate. The product has the composition

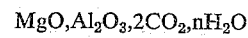

as determined by chemical analysis. Its X-ray diffraction spectrum and its chemical properties indicate that its structure may be represented as

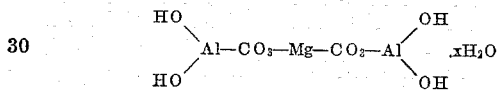

whence is derived the name "Tetrahydroxy Dialuminum Magnesium Carbonate," hereinafter also referred to as basic aluminum magnesium carbonate.

This substance meets the requirements of the ideal gastric anti-acid in every way: it is tasteless, non-toxic and non-irritating; its equivalent weight is low (33 to 40, depending on the degree of hydration); it reacts very rapidly with acid, but cannot raise the pH of the gastric contents above approximately 4; and it retains control for a relatively long time over any tendency of the gastric juice to resume an undesirably high level of acidity.

The action of basic aluminum magnesium carbonate in promptly neutralizing excess acid to a certain level, and then maintaining that level for a considerable time thereafter, is explainable by a study of its behavior with acid in vitro. If dilute acid, such as N/10 HCl, is added to the compound in the proportion of two moles of acid per mole of anti-acid, it may be observed that a vigorous evolution of carbon dioxide takes place, leaving a turbid liquid. Tests show that at this point practically all the carbon dioxide has been lost from the original sample, that the aluminum content is in the form of aluminum hydroxide suspended in the mother liquor, and that the latter consists of a solution of magnesium chloride with a pH of approximately 4. Subsequent introduction of additional dilute acid up to three times the original amount does not appreciably raise the pH above this point. These steps represent the initial neutralization of excess acid, and the later buffering of the solution by the liberated aluminum hydroxide.

The rapidity of action, duration of pH control, and lack of over-neutralization are also demonstrated in tests by the method for "Prolonged Neutralization Capacity," or "Prolonged Buffering Action," of Holbert, Noble and Grote (J. Am. Pharm. Assn., Sci. Ed. 37, 292–4 (1948)). In the following table, tetrahydroxy dialuminum magnesium carbonate (Col 5) is compared with sodium bicarbonate, magnesium hydroxide and aluminum hydroxide by plotting the pH of the acid-antacid mixture as a function of time elapsed since mixing.

| Time, Minutes | pH | | | |
|---|---|---|---|---|
| | NaHCO₃ | Mg(OH)₂ | Al(OH)₃ | TDMC |
| 0 | 1.6 | 1.6 | 1.6 | 1.6 |
| 1 | 6.9 | 8.4 | 2.1 | 3.7 |
| 3 | 6.9 | 8.9 | 2.3 | 4.0 |
| 5 | 6.9 | 9.0 | 2.5 | 4.1 |
| 10 | 7.0 | 9.0 | 3.2 | 4.2 |
| 20 | 7.1 | 9.0 | 3.7 | 4.3 |
| 30 | 7.2 | 9.0 | 3.7 | 4.2 |
| 40 | 7.2 | 9.0 | 3.7 | 4.3 |
| 50 | 7.1 | 8.9 | 3.7 | 4.3 |
| 60 | 7.0 | 8.9 | 3.7 | 4.3 |
| 70 | 7.0 | 8.8 | 3.6 | 4.2 |
| 80 | 6.9 | 8.7 | 3.5 | 4.2 |
| 90 | 6.8 | 8.6 | 3.5 | 4.2 |
| 100 | 6.7 | 8.4 | 3.3 | 4.1 |
| 110 | 6.5 | 8.1 | 3.1 | 4.1 |
| 120 | 6.4 | 7.7 | 2.8 | 4.0 |

It is evident that the first two substances act quickly but over-alkalize badly, that the third buffers adequately but is slow to reach equilibrium, and that basic aluminum magnesium carbonate is both very rapid in action and an excellent buffer at a pH close to 4.

The basic alumnium magnesium carbonate of our invention is thus demonstrably superior in one or more ways to any previously known anti-acid for internal use. Unlike calcium carbonate, magnesium carbonate, calcium hydroxide, magnesium hydroxide and magnesium trisilicate, it cannot over-alkalize and provides extended buffer action. In contrast to sodium bicarbonate, it is tasteless. It is free from the deficiencies of aluminum hydroxide, or a mixture thereof with one of the foregoing substances, in that it may be employed in the dry state with no reduction of activity and neutralizing capacity. It even surpasses basic aluminum sodium carbonate in two respects: since it contains no sodium, it may be freely used in connection with low-sodium and sodium-free diets, which are frequently encountered in the treatment of cardio-vascular disease. Furthermore, it does contain a small but appreciable proportion of magnesium, which is believed to be beneficial in counteracting the tendency to constipation sometimes observed as a side-effect of the administration of aluminum compounds.

In addition to its use directly as a gastric anti-acid, basic aluminum magnesium carbonate has other applications. For example, it may be an ingredient in formulations designed to have a primarily analgesic or antipyretic action, particularly where such a formulation includes a component known or suspected to stimulate the secretion of gastric acid. In this manner the intestinal irritation which sometimes results from ingestion of analgesics is minimized. It is also useful in preparations designed to be taken internally as a carminative.

It is known that basic aluminum soidum carbonate may be prepared by heating an active aluminum hydroxide gel with an excess of sodium bicarbonate in aqueous solution. If this procedure be attempted with the substitution of a magnesium bicarbonate solution for the sodium bicarbonate, carbon dioxide will be driven off before any reaction can take place. Simultaneously, insoluble magnesium carbonate will be precipitated, and the product, instead of being basic aluminum magnesium carbonate, will be a physical mixture of magnesium carbonate and aluminum hydroxide. The proof of this is fourfold: the precipitate contains only one-half as much carbon dioxide per gram-atom of magnesium as is demanded by the formula for basic aluminum magnesium carbonate (but the correct amount for magnesium carbonate itself); the precipitate contains all the magnesium in the original solution, which need not be in any stoichiometric proportion to the aluminum; the magnesium can be extracted from the precipitate by leaching with a solution of carbonic acid, leaving only aluminum hydroxide; and the dried product is incompletely soluble in dilute acid, showing the presence of free aluminum hydroxide which has been dehydrated to insoluble aluminum oxide.

In order to produce basic aluminum magnesium carbonate by the process of the present invention, it is necessary to maintain the reaction mixture under a pressure of excess carbon dioxide while heating it. By thus preventing escape of the gas, the conversion of magnesium bicarbonate to normal carbonate is prevented, and the bicarbonate is retained in solution throughout the time necessary to allow its reaction with the aluminum hydroxide. When this is done, the product contains the theoretical percentage of carbon dioxide called for by the formula for basic aluminum magnesium carbonate; it contains no more than one gram-atom of magnesium for every two gram-atoms of aluminum, no matter how large an excess of magnesium may have been taken initially; its compostion is not altered by leaching with carbonic acid; and it is quickly and completely soluble in dilute acid.

Basic aluminum sodium carbonate may also be produced by the addition of a solution of sodium aluminate to a solution of sodium bicarbonate. If, on the other hand, the aluminate solution is added to a solution of magnesium bicarbonate, the precipitate formed is not basic aluminum magnesium carbonate but a physical mixture of magnesium carbonate and aluminum hydroxide as in the preceding example. This is demonstrable by the tests cited above. The explanation lies in the facts that sodium aluminate is stable only in a strongly alkaline solution containing excess caustic, whereas magnesium bicarbonate is stable only in a relatively acidic solution containing excess free carbon dioxide. On acidification, the aluminate solution deposits aluminum hydroxide; when made alkaline, the magnesium bicarbonate solution precipitates magnesium carbonate. In mixing these two solutions, therefore, they simply neutralize each other and each decomposes separately to its characteristic product.

Basic aluminum magnesium carbonate may be produced from these two ingredients only if the magnesium bicarbonate solution is kept saturated with carbon dioxide, while the aluminate solution is added thereto at such a rate that the carbon dioxide remains always in excess. Under these conditions it is possible for a basic complex carbonate to form, because, although sodium aluminate is decomposed by carbon dioxide, the rate of this decomposition is slower than the rate of formation of the aluminum magnesium carbonate.

Special precautions are also required in handling the product of these reactions. Basic mixed aluminum carbonates are relatively easily hydrolyzed; basic aluminum sodium carbonate, for instance, forms an equilibrium with a .06 molar solution of sodium bicarbonate. If suspended in water, it will hydrolyze to aluminum hydroxide and sodium bicarbonate until the latter reaches this concentration. Because of the stability of sodium bicarbonate, the process goes no farther. Basic aluminum magnesium carbonate hydrolyzes similarly, to establish a comparable equilibrium. Because of the instability of magnesium bicarbonate, however, if carbon dioxide is allowed to escape from the suspension the magnesium is gradually transformed to insoluble carbonate. The equilibrium is thus disturbed, and the starting material is eventually completely converted to a mixture of aluminum hydroxide and magnesium carbonate. This may be prevented by maintaining an atmosphere of carbon dioxide over the moist product, and by drying it as rapidly as possible and at the lowest possible temperature. In the dry state the compound is no longer subject to deterioration, as water is necessary for its decomposition.

In accordance with the present invention, basic aluminum magnesium carbonate is produced by mixing aluminum hydroxide, or a derivative thereof, with a solution containing magnesium bicarbonate in the presence of an excess of carbon dioxide. Aluminum hydroxide gel may serve as a starting material or an aluminum hydroxide derivative, such as aluminum isopropoxide or an alkali metal aluminate, may be employed. By way of example, sodium aluminate, potassium aluminate, lithium aluminate, rubidium aluminate or cesium aluminate may be used as a starting material. The following examples are included to illustrate the present invention as applied to particular aluminum hydroxide derivatives. However, it will be understood that the same process steps will be applicable to other aluminum hydroxide derivatives to produce basic aluminum magnesium carbonate.

*Example 1*

In a reaction vessel equipped with a mechanical stirrer, a gas inlet and dispersion tube, a means for adding liquid at a controlled rate, and a set of electrodes for determination of the pH of the mixture, is placed 1.1 liters of an aqueous solution of magnesium bicarbonate of 0.2 molar concentration. With the stirrer in vigorous operation, a steady stream of carbon dioxide is allowed to flow into the solution through the gas dispersion tube. A quantity of sodium aluminate containing 0.4 gram-atom of aluminum, corresponding to 33 gm. of actual $NaAlO_2$, is dissolved in 2 to 4 times its own weight of water to make a fairly concentrated solution, and this is allowed to flow slowly into the stirred, carbonated magnesium solution at such a rate as to keep the mixture very faintly basic, preferably at a pH between 7 and 9. Stirring and saturation with carbon dioxide is continued for a short time after the last of the aluminate solution has been added; the slurry is then filtered or centrifuged to remove as much of the mother liquor as possible. The filter cake is washed with one or two times its own volume of water saturated with carbon dioxide, to remove sodium and magnesium bicarbonates, and is then dried as rapidly as possible at a low temperature. Flash-drying is preferable, as by this method hydrolysis with loss of carbon dioxide is minimized. The yield is approximately 55 gm. of an impalpable white powder, rapidly and completely soluble in acids with the evolution of much carbon dioxide. A typical analysis of this product is:

| | Percent |
|---|---|
| $Al_2O_3$ | 32 |
| MgO | 12.5 |
| $CO_2$ | 27.5 | which corresponds to the formula $(OH)_4Al_2Mg(CO_3)_2.3H_2O$ or $Al_2O_3,MgO,2CO_2,5H_2O$.

*Example 2*

In a reaction vessel equipped with a mechanical stirrer, a gas inlet and dispersion tube, and a means for adding liquid at a controlled rate, is placed 1.1 liters of an aqueous solution of magnesium bicarbonate of 0.2 molar concentration. With the stirrer in vigorous operation, a steady stream of carbon dioxide is allowed to flow into the solution through the gas dispersion tube. To this stirred, carbonated magnesium solution there is slowly added, at a rate such that local excesses are avoided and thorough mixing is promptly achieved, 82 gm. (0.4 mole) of liquid aluminum isopropoxide, either as the supercooled molten form or as a solution in a minimum of warm absolute isopropyl alcohol. The mixture is stirred for a few minutes after addition is complete, and the precipitated product is collected by filtration, centrifugation or decantation. It is washed with one or two volumes of water saturated with carbon dioxide, to remove soluble salts and isopropyl alcohol, and dried as rapidly as possible at a low temperature. Flash-drying is recommended. There is obtained about 55 gm. of material identical in all respects with that afforded by the process of Example 1.

*Example 3*

Aluminum hydroxide gel is prepared, by known methods leading to a product of highest activity, as a paste containing approximately 10% of $Al_2O_3$ by weight. A quantity of this paste corresponding to 0.4 gram-atom of aluminum (204 gm. of 10% gel) is added to 1.1 liters of an aqueous solution of magnesium bicarbonate of 0.2 molar concentration, and the mixture is stirred until a uniform dispersion is obtained. This is introduced into a pressure vessel equipped with a stirrer, a gas inlet tube, and a means for heating the contents. Under continuous stirring, the air in the reactor is replaced by an atmosphere of carbon dioxide; the vessel is then sealed and additional carbon dioxide is admitted to a pressure of 1 to 3 atmospheres. When equilibrium has been established and gas no longer is absorbed by the contents of the reactor, the carbon dioxide supply line is shut off and heat is applied to the vessel. The temperature is maintained, with uninterrupted stirring, between 50 and 100° C. for several hours; at the end of this time the reaction mixture is cooled, the pressure is released, and the precipitate is separated from the mother liquor by filtration or centrifugation. After washing with several volumes of water saturated with carbon dioxide to remove excess magnesium bicarbonate, the cake is dried as rapidly as possible at a low temperature, preferably by a flash-drying technique. The product is approximately 55 gm. of a material identical in all respects with that afforded by Examples 1 and 2.

While we have described the present invention in terms of preferred examples, it will be understood that various modifications and supplemental steps may be employed in carrying out the process as defined in the appended claims. For instance, it is intended that solutions of magnesium bicarbonate of concentrations other than 0.2 molar may be used, that solutions of sodium aluminate varying in concentration over a wide range are permissible, and that in some circumstances it may be desirable to use carbon dioxide at pressures considerably in excess of 3 atmospheres. In all variations of the present invention it should be noted, however, that the proportions are at least one-half gram-atom of magnesium per gram-atom of aluminum used and that the carbon dioxide is maintained in an excess amount.

For use as an antacid, basic aluminum magnesium carbonate is preferably tabletted in unit doses containing approximately 5 grains of the active ingredient per tablet. Sugar, dextrin or other binder can be used in the tabletting operation. It is advisable to avoid the use of plain water at any stage; where solvents are necessary, as in granulating, alcohol, or dilute alcohol of at least 50% strength, is a better choice. This minimizes the risk of hydrolyzing the basic aluminum magnesium carbonate, and is an aid in incorporating flavoring materials, which are as a rule much more readily soluble in alcohol than in water.

For the treatment of gastric hyperacidity, these tablets are taken by mouth. A single 5-grain dose is nearly always sufficient to afford prompt relief, lasting for at least two hours. If distress recurs, the dose may be repeated ad libitum. Because of the lack of "acid rebound," however, the treatment seldom needs to be applied more than once to control a single attack.

Having thus described our invention, we claim:

1. The compound tetrahydroxy dialuminum magnesium carbonate, having the formula $(OH)_4Al_2Mg(CO_3)_2.nH_2O$.

2. A process for preparing basic aluminum magnesium carbonate wherein an aluminum compound selected from the group consisting of aluminum hydroxide, the alkali metal aluminates and aluminum isopropoxide is mixed with a solution containing magnesium bicarbonate, in the proportions of at least one-half gram-atom of magnesium per gram-atom of aluminum used, in the presence of carbon dioxide under pressure and in an amount in stoichiometric excess.

3. A process for preparing basic aluminum magnesium carbonate wherein a solution of an alkali metal aluminate is mixed with a solution containing magnesium bicarbonate, in the proportions of at least one-half gram-atom of magnesium per gram-atom of aluminum used, in the presence of carbon dioxide under pressure and in an amount sufficient to convert all of the alkali in the aluminate solution to an alkali metal bicarbonate.

4. A process for preparing basic aluminum magnesium carbonate wherein a solution of sodium aluminate is mixed with a solution containing magnesium bicarbonate, in the proportions of at least one-half gram-atom of magnesium per gram-atom of aluminum used, in the presence of carbon dioxide under pressure and in an amount sufficient to convert all of the alkali in the aluminate solution to a sodium bicarbonate.

5. A process for preparing basic aluminum magnesium carbonate wherein a solution of potassium aluminate is mixed with a solution containing magnesium bicarbonate, in the proportions of at least one-half gram-atom of magnesium per gram-atom of aluminum used, in the presence of carbon dioxide under pressure and in an amount sufficient to convert all of the alkali to the aluminate solution to a potassium bicarbonate.

6. A process for preparing basic aluminum magnesium carbonate wherein aluminum isopropoxide is mixed with a solution containing magnesium bicarbonate, in the proportions of at least one-half gram-atom of magnesium per gram-atom of aluminum used, in the presence of carbon dioxide under pressure and in an amount in stoichiometric excess.

7. A process for preparing basic aluminum magnesium carbonate wherein aluminum isopropoxide dissolved in isopropyl alcohol is mixed with a solution containing magnesium bicarbonate, in the proportions of at least one-half gram-atom of magnesium per gram-atom of aluminum used, in the presence of carbon dioxide under pressure and in an amount in stoichiometric excess.

8. A process for preparing basic aluminum magnesium carbonate wherein freshly-precipitated aluminum hydroxide gel is heated in an atmosphere of carbon dioxide under pressure with a solution containing magnesium bicarbonate, in the proportions of at least one-half gram-atom of magnesium per gram-atom of aluminum used.

9. The process of claim 8 in which the carbon dioxide is under a pressure of from about 1 to about 3 atmospheres.

10. In a preparation designed to be taken internally as a carminative and for the relief of gastric hyperacidity, a composition having as an active ingredient about five to ten grains per unit dosage of tetrahydroxy dialuminum magnesium carbonate having the formula $$(OH)_4Al_2Mg(CO_3)_2 \cdot nH_2O$$

References Cited in the file of this patent
UNITED STATES PATENTS

| | | |
|---|---|---|
| 2,570,532 | Eisenberg | Oct. 9, 1951 |
| 2,797,978 | Beekman | July 2, 1957 |

FOREIGN PATENTS

| | | |
|---|---|---|
| 19,784 | Germany | Oct. 12, 1882 |
| 70,175 | Germany | Dec. 25, 1892 |